(12) United States Patent
Mi (10) Patent No.: US 11,605,497 B2
(45) Date of Patent: Mar. 14, 2023

(54) TRANSFORMER WITH INTERLEAVED SHIELDING WINDINGS

(71) Applicant: Silanna Asia Pte Ltd, Singapore (SG)

(72) Inventor: Ningliang Mi, Arlington Heights, IL (US)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 17/443,279

(22) Filed: Jul. 23, 2021

(65) Prior Publication Data

US 2022/0037077 A1 Feb. 3, 2022

Related U.S. Application Data

(60) Provisional application No. 63/059,447, filed on Jul. 31, 2020.

(51) Int. Cl.
| | | |
|---|---|---|
| *H01F 27/28* | (2006.01) | |
| *H02M 3/335* | (2006.01) | |
| *H01F 41/04* | (2006.01) | |
| *H01F 27/24* | (2006.01) | |
| *H01F 27/32* | (2006.01) | |
| *H01F 27/29* | (2006.01) | |

(52) U.S. Cl.
CPC .......... *H01F 27/289* (2013.01); *H01F 27/24* (2013.01); *H01F 27/29* (2013.01); *H01F 27/325* (2013.01); *H01F 41/04* (2013.01); *H02M 3/33576* (2013.01)

(58) Field of Classification Search
CPC ........ H01F 27/289; H01F 27/24; H01F 27/29; H01F 27/325; H01F 41/04; H02M 3/33576
See application file for complete search history.

(56) References Cited

U.S. PATENT DOCUMENTS

| | | | | |
|---|---|---|---|---|
| 2,553,324 | A * | 5/1951 | Lord ....................... | H01F 27/36 336/73 |
| 7,710,085 | B2 * | 5/2010 | Park .................. | H02M 3/33523 323/251 |
| 9,576,720 | B2 | 2/2017 | Groot | |
| 9,722,499 | B2 * | 8/2017 | Martin .................... | H02M 1/44 |
| 9,941,047 | B2 | 4/2018 | Ortiz | |
| 2006/0044844 | A1 | 3/2006 | Utsuno et al. | |

(Continued)

FOREIGN PATENT DOCUMENTS

WO    2019091393 A1    5/2019

OTHER PUBLICATIONS

International Search Report and Written Opinion dated Oct. 26, 2021 for PCT Patent Application No. PCT/IB2021/056681.

*Primary Examiner* — Mang Tin Bik Lian
(74) *Attorney, Agent, or Firm* — MLO, a professional corp.

(57) ABSTRACT

A transformer includes first and second primary windings serially electrically connected in a primary-side series combination. The transformer further includes a secondary winding disposed between the first primary winding and the second primary winding. The transformer further includes first and second shielding windings serially electrically connected in a shielding series combination. The first shielding winding is disposed between the first primary winding and the secondary winding, and the second shielding winding is disposed between the second primary winding and the secondary winding.

14 Claims, 9 Drawing Sheets

(56) References Cited

U.S. PATENT DOCUMENTS

| | | | |
|---|---|---|---|
| 2007/0152794 A1* | 7/2007 | Chen | H01F 29/14 336/212 |
| 2010/0109832 A1* | 5/2010 | Espino | H02M 3/335 336/84 C |
| 2014/0334198 A1 | 11/2014 | Yang et al. | |
| 2014/0347159 A1 | 11/2014 | Zuo et al. | |
| 2017/0047848 A1 | 2/2017 | Huang et al. | |
| 2017/0117091 A1* | 4/2017 | Serrano | H02M 3/28 |
| 2017/0163145 A1 | 6/2017 | Cheng et al. | |
| 2017/0163164 A1* | 6/2017 | Martin | H02M 3/28 |
| 2017/0366044 A1* | 12/2017 | Tao | H02M 3/33576 |
| 2020/0168389 A1 | 5/2020 | Zhang et al. | |
| 2020/0211762 A1 | 7/2020 | Jitaru et al. | |
| 2021/0366647 A1* | 11/2021 | Fei | H02M 7/04 |

* cited by examiner

TRANSFORMER WITH INTERLEAVED SHIELDING WINDINGS

RELATED APPLICATIONS

This application claims priority to U.S. Provisional Patent Application No. 63/059,447, filed on Jul. 31, 2020, and entitled, "Transformer with Interleaved Shielding Windings", all of which is hereby incorporated by reference in its entirety and for all purposes.

BACKGROUND

Switch-mode power supplies ("power converters") are power management components in modern electronic devices. They provide, among other things, efficient and galvanically isolated power to multiple loads. To achieve high power processing efficiency and/or galvanic isolation, conventionally one or more magnetically coupled elements, semiconductor switches and associated gate driver circuits are required. Some power converters, such as fly-back converters, include a transformer that couples a primary-side of the power converter to a secondary-side of the power converter. An input voltage is received at the primary-side of the power converter and an output voltage is produced at the secondary-side of the power converter.

Inter-winding parasitic capacitive coupling occurs between primary windings of the transformer and secondary windings of the transformer. Such inter-winding capacitance allows a common mode noise current to flow from the primary-side of the power converter to the secondary-side of the power converter. The common mode noise current typically returns from the secondary-side of the power converter to the primary-side of the power converter via a ground path or parasitic capacitance, thereby producing undesirable or impermissible electromagnetic interference (EMI) at a voltage input of the power converter.

Some applications, such as USB power delivery devices (USB-PD), conventionally require a very low value Y Capacitor (typically less than 470 pF) for EMI noise filtering. For such application, an effective and consistent noise shielding structure is conventionally essential for the system to meet EMI standard requirements.

SUMMARY

In some embodiments, a transformer includes a first primary winding and a second primary winding serially electrically connected in a primary-side series combination, the primary-side series combination having a first primary-side terminal and a second primary-side terminal. The transformer further includes a secondary winding having a first secondary-side terminal and a second secondary-side terminal and disposed between the first primary winding and the second primary winding. The transformer further includes a first shielding winding and a second shielding winding serially electrically connected in a shielding series combination at an intermediate shielding terminal, the shielding series combination having a first shielding terminal and a second shielding terminal. The first shielding winding is disposed between the first primary winding and the secondary winding, and the second shielding winding is disposed between the second primary winding and the secondary winding.

In some embodiments, the first primary-side terminal is configured to be electrically connected to a first node at a primary-side of a power converter; the second primary-side terminal is configured to be electrically connected to a second node at the primary-side of the power converter; the first secondary-side terminal is configured to be electrically connected to a first node at a secondary-side of the power converter; the second secondary-side terminal is configured to be electrically connected to a second node at the secondary-side of the power converter; the intermediate shielding terminal is configured to be electrically connected to a third node at the primary-side of the power converter; and the first shielding terminal and the second shielding terminal are configured to be electrically floating.

In some embodiments, the third node at the primary-side of the power converter is a primary-side ground node. In some embodiments, the first node at the primary-side of the power converter is a drain node of a main switch of the power converter; the second node at the primary-side of the power converter is an input voltage node for an input voltage of the power converter; the first node at the secondary-side of the power converter is a drain node of a secondary-side switch of the power converter; and the second node at the secondary-side of the power converter is an output voltage node for an output voltage of the power converter.

In some embodiments, the transformer also includes a cylindrical bobbin having a central core. The first primary winding is wound around the central core of the cylindrical bobbin. The first shielding winding is wound around the first primary winding. The secondary winding is wound around the first shielding winding. The second shielding winding is wound around the secondary winding. The second primary winding is wound around the second shielding winding.

In some embodiments, the first shielding winding and the second shielding winding are aligned symmetrically on opposite sides of the secondary winding.

In some embodiments, a power converter includes the above-described transformer.

In some embodiments, a method of forming the above transformer is disclosed.

DETAILED DESCRIPTION

In applications like USB-PD which requires a very low value Y Capacitor (typically less than 470 pF) for EMI noise filtering, an effective and consistent noise shielding structure is essential for the system to meet EMI standard requirements. As disclosed herein, a transformer having interleaved shielding windings advantageously blocks common mode noise current from flowing between the primary and secondary windings of the transformer. As such, power converters implemented using the transformer as disclosed herein can advantageously use a low capacitance Y Capacitor, or even no Y Capacitor, and still comply with the EMI standard requirements. The transformer disclosed herein is advantageously manufacturable using a straightforward approach with good repeatability and consistency regardless of the particular transformer manufacturing process used.

Figure 1:
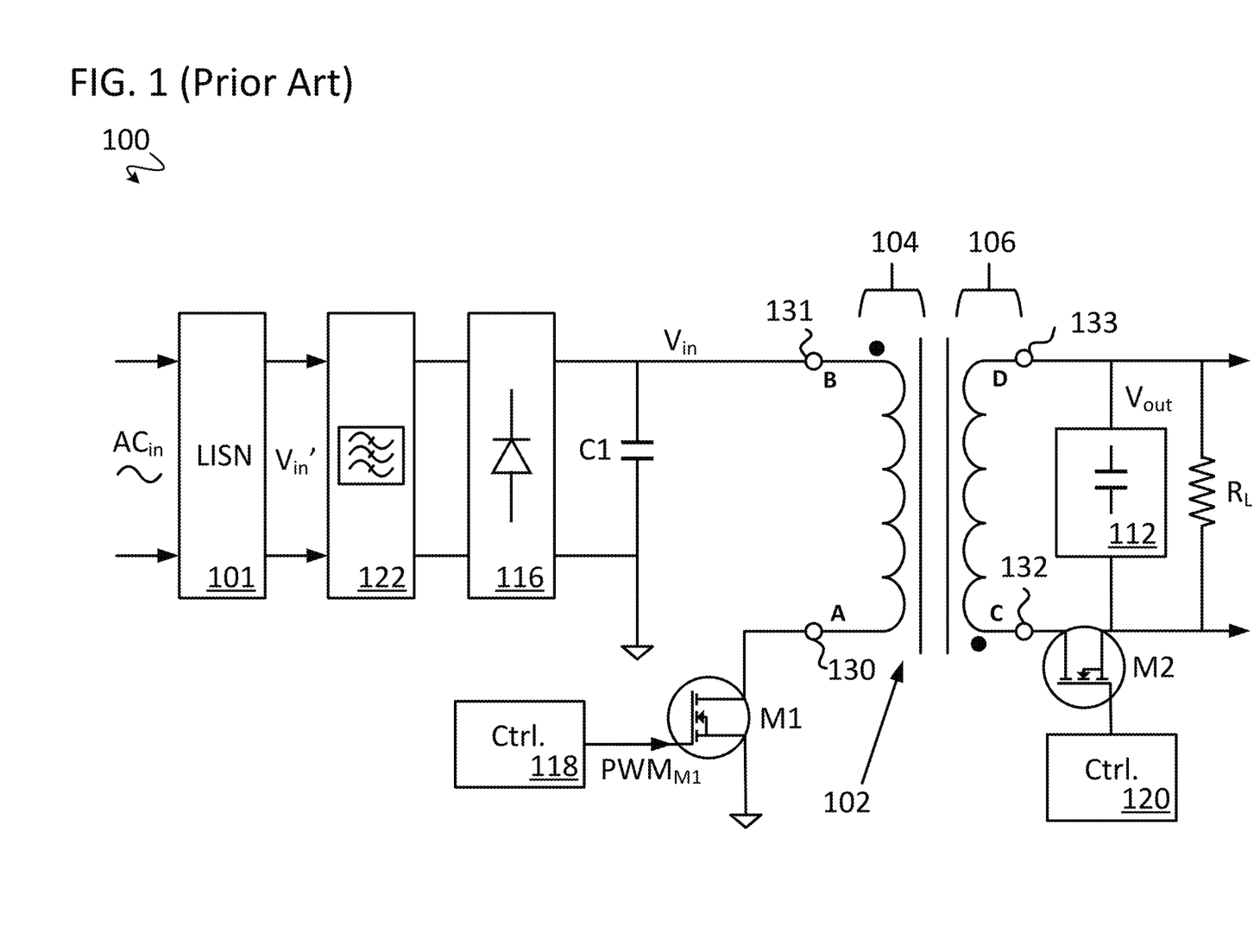
FIG. 1 is a simplified schematic of a conventional power converter.

FIG. 1 is a simplified circuit schematic of a conventional power converter 100 under EMI test. Some elements of the power converter 100 have been omitted from FIG. 1 to simplify the description of power converter 100 but are understood to be present. A voltage source $AC_{in}$ is received at a Line Impedance Stabilization Network (LISN) 101. The LISN 101 is used to perform conducted and radiated radio-frequency emission and susceptibility (EMI) tests of the power converter 100. A voltage source $V_{in}'$, based on the voltage source $AC_{in}$, is provided by the LISN 101 to an input side of the power converter 100. The input side of the power converter 100 generally includes an input voltage filter block 122, a rectifier block 116, an input voltage buffer capacitor C1, a main switch M1 driven by a pulse-width-modulation (PWM) signal $PWM_{M1}$, and a primary-side controller circuit ("Ctrl.") 118. The input voltage filter block 122, the rectifier block 116 and the input buffer capacitor C1 provide a filtered, buffered, rectified, or otherwise conditioned input voltage $V_{in}$ (i.e., a DC input voltage) to a transformer 102.

The transformer 102 transfers power from the primary-side of the power converter 100 to a secondary-side of the power converter 100 and generally includes primary windings 104 with a first terminal 130 ('A') and a second terminal 131 ('B'). The secondary-side of the power converter 100 generally includes secondary windings 106 of the transformer 102 with a first terminal 132 ('C') and a second terminal 133 ('D'), an output buffer circuit 112, a synchronous rectifier switch M2, a synchronous rectifier switch controller circuit ("Ctrl.") 120, and is configurable to be connected to a load $R_L$.

The second terminal 131 of the primary windings 104 receives the DC input voltage $V_{in}$. The first terminal 130 of the primary windings 104 is coupled to a drain node of the main switch M1. The main switch M1 controls a current through the primary windings 104 to charge a magnetizing inductance of the transformer 102 during a first portion of a switching cycle of the power converter 100. The synchronous rectifier switch M2 controls a current flow through the secondary windings 106 to discharge the transformer 102 into the output buffer circuit 112 and the load $R_L$ during a subsequent portion of the switching cycle.

When the main switch M1 is enabled by the primary-side controller circuit 118 during the first portion of a switching cycle, current flows through the primary windings 104 to a voltage bias node such as earth ground, illustrated in FIG. 1 as a triangle coupled to a source node of the main switch M1. The current flow through the primary windings 104 causes energy to be stored in the magnetizing inductance and a leakage inductance of the transformer 102. When the main switch M1 is disabled in a subsequent portion of the switching cycle, an output voltage $V_{out}$ is generated at the output buffer circuit 112 and is provided to the load $R_L$.

Figure 2:
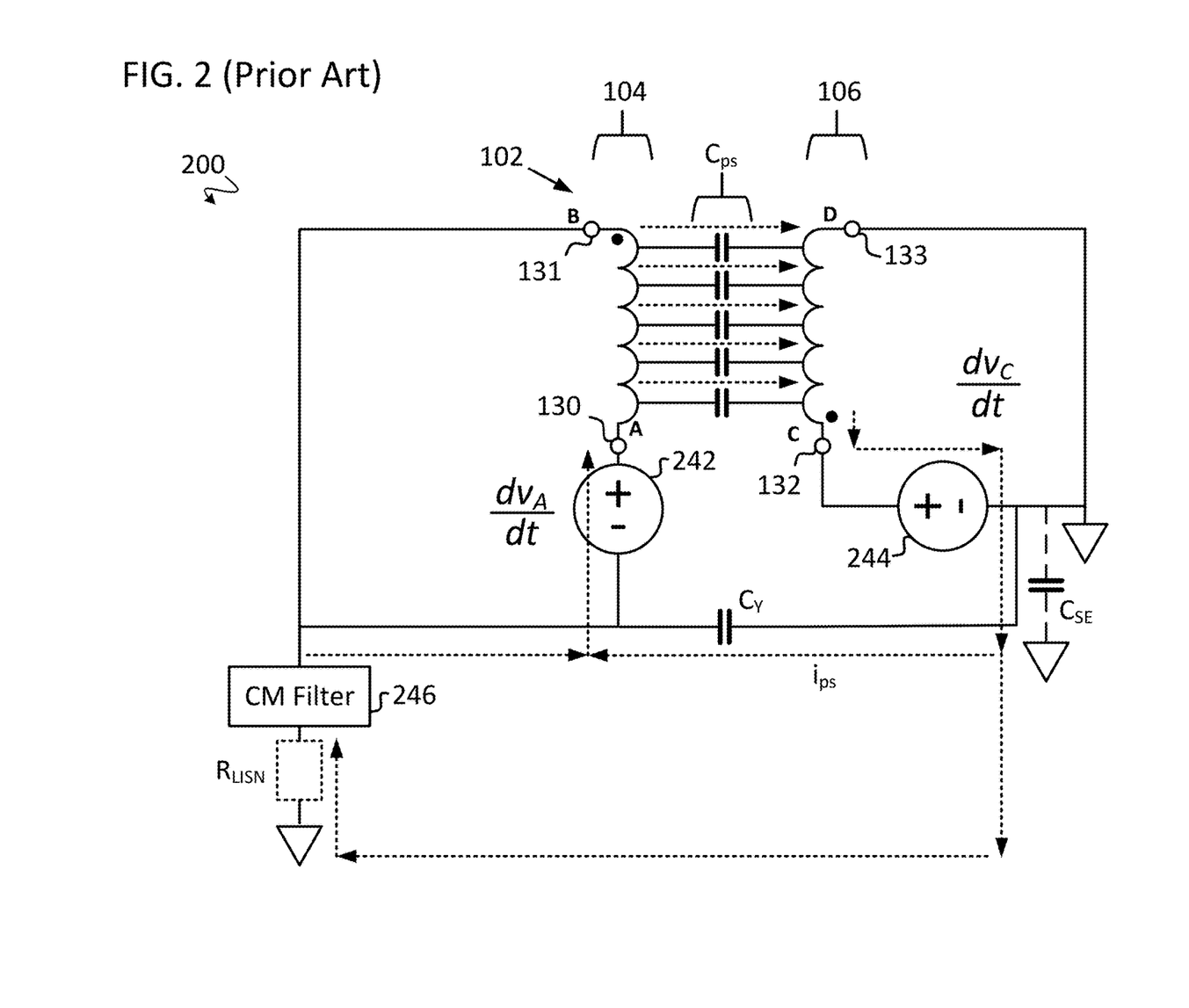
FIG. 2 is a simplified model of the conventional power converter of FIG. 1.

FIG. 2 is a simplified schematic representation of a modeled power converter 200 that models a common mode noise current propagation path through the power converter 100 of FIG. 1 for conducted noise analysis. The modeled power converter 200 generally includes the transformer 102 of FIG. 1 that includes the terminals 130-133. Additionally the modeled power converter 200 includes a primary-side common mode noise source 242, a secondary-side common mode noise source 244, a common-mode noise filter circuit 246, a resistor $R_{LISN}$ of the LISN 101, a Y Capacitor $C_Y$, a representation of a parasitic capacitance $C_{SE}$, and representations of primary-side to secondary-side inter-winding parasitic capacitance $C_{ps}$ of the transformer 102. Also shown is a representation of a common mode noise current $i_{ps}$ which flows through the transformer 102 due to the inter-winding capacitance $C_{ps}$.

The inter-winding capacitance $C_{ps}$ is a significant path for common mode noise current between the primary-side of the modeled power converter 200 (i.e., the portion connected to the terminals 130 and 131 of the transformer 102) and the secondary-side of the modeled power converter 200 (i.e., the portion connected to the terminals 132 and 133 of the transformer 102). The switches M1, M2 of FIG. 1 are modeled as respective voltage sources, embodied as the primary-side common mode noise source 242 and the secondary-side common mode noise source 244. Performance of the switches M1, M2 of FIG. 1 can introduce severe voltage pulses, $$\frac{dV_A}{dt}, \text{ and } \frac{dV_C}{dt},$$

respectively. These severe voltage pulses, $$\frac{dV_A}{dt}, \text{ and } \frac{dV_C}{dt}$$

generate the common mode noise current $i_{ps}$ which flows through the inter-winding capacitance $C_{ps}$ and then returns to the primary-side of the modeled power converter 200 either through the parasitic capacitance $C_{SE}$ when the secondary-side is not connected to earth ground, or directly through a ground-loop when the secondary-side is connected to earth ground. The Y Capacitor $C_Y$ is used to mitigate noise on the ground loop by providing an alternate path for the common mode noise current $i_{ps}$.

Nulling the flow of the common mode noise current $i_{ps}$ from the primary windings 104 of the transformer 102 to the secondary windings 106 of the transformer 102 can dramatically reduce measured conducted noise at the resistor $R_{LISN}$ of the LISN 101. The common mode noise current $i_{ps}$ generated from the voltage pulses $$\frac{dV_A}{dt}, \text{ and } \frac{dV_C}{dt}$$

acting on the inter-winding capacitance $C_{ps}$ can be generally expressed as $$i_{ps} = C_{ps} \times \frac{dV}{dt}$$

Thus, to reduce or eliminate the common mode noise current $i_{ps}$, either the inter-winding capacitance $C_{ps}$ can be reduced or eliminated, or voltage balancing techniques can be used to minimize the voltage pulses $$\frac{dV_A}{dt}, \frac{dV_C}{dt}.$$

Figure 3A:
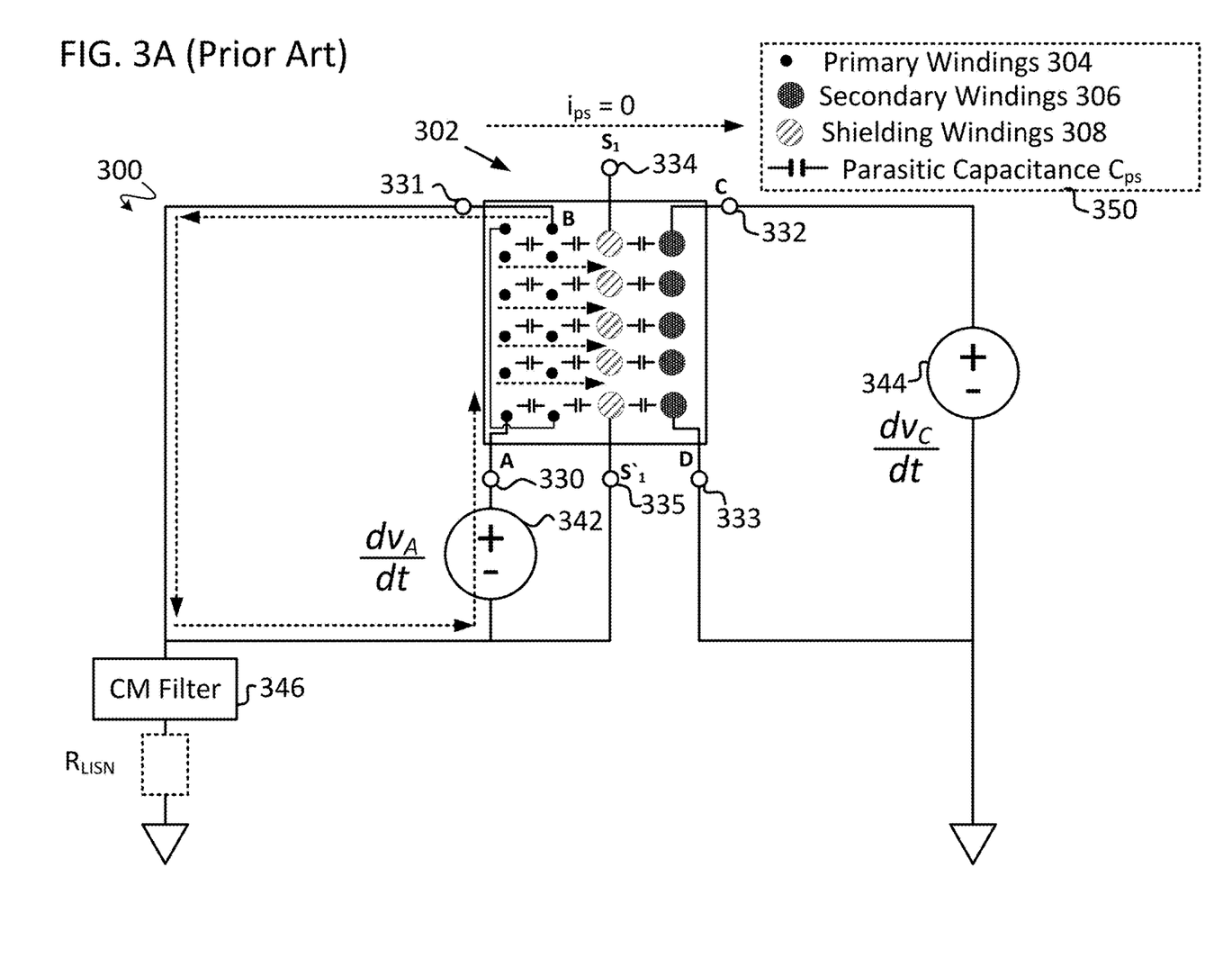
FIG. 3A is another simplified model of the conventional power converter of FIG. 1.

FIG. 3A is another simplified schematic representation of a modeled power converter 300 that models the power converter 100 of FIG. 1 for conducted noise analysis and illustrates an idealized transformer configuration for reducing the common mode noise current $i_{ps}$. The modeled power converter 300 generally includes a transformer 302 that includes terminals 330 ('A'), 331 ('B'), 332 ('C'), 333 ('D'), 334 ('S$_1$'), and 335 ('S'$_1$'). As indicated by the legend 350, the transformer 302 also includes primary windings 304, secondary windings 306, shielding windings 308, and inter-winding parasitic capacitance $C_{ps}$. Additionally, the modeled power converter 300 includes a primary-side common mode noise source 342, a secondary-side common mode noise source 344, a common-mode noise filter circuit 346, and a resistor $R_{LISN}$ of the LISN 101. The primary-side common mode noise source 342, secondary-side common mode noise source 344, and common-mode noise filter circuit 346 are the same or similar to the elements 242, 244, and 246, respectively, described with respect to FIG. 2. Also shown is a representation of the common mode noise current $i_{ps}$ which has been reduced to 0 Amps due to the idealized configuration of the transformer 302.

Similar to that as described with regard to FIG. 2, the switches M1, M2 of FIG. 1 are modeled as respective voltage sources, embodied as the primary-side common mode noise source 342 and the secondary-side common mode noise source 344 which introduce voltage pulses, $$\frac{dV_A}{dt}, \text{ and } \frac{dV_C}{dt},$$

respectively. These voltage pulses, $$\frac{dV_A}{dt}, \text{ and } \frac{dV_C}{dt}$$

generate the common mode noise current $i_{ps}$ which flows through the inter-winding capacitance $C_{ps}$ of the transformer 302. However, as shown, the shielding windings 308 are identical in number and alignment as compared to the secondary windings 306. Thus, assuming that voltage developed across the windings 306, 308 is distributed linearly along the respective windings 306, 308, then for a specific point on the shielding windings 308, that point shares the same voltage potential as compared to a corresponding point on the secondary windings 306. Consequently, there is no voltage difference between the shielding windings 308 and the secondary windings 306. Because there is no voltage difference between the windings 306, 308, no displacement current flows between the windings 306, 308. Thus, the common mode noise current $i_{ps}$ flowing through the primary windings 304 to the secondary windings 306 is blocked.

Figure 3B:
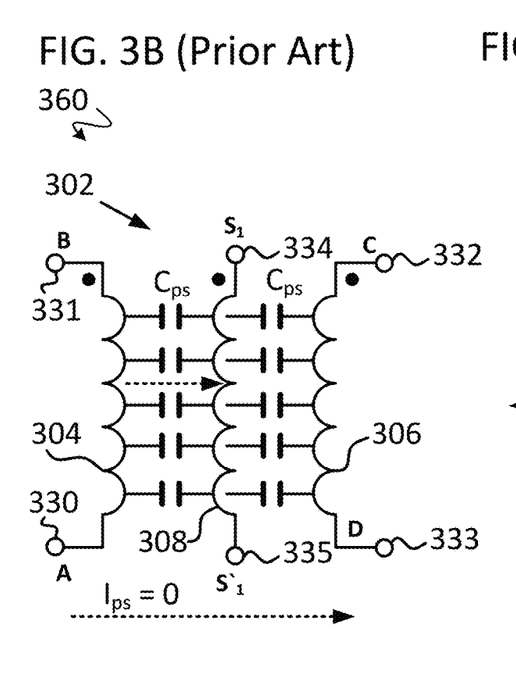
FIG. 3B is a schematic representation of an ideal conventional transformer for blocking common mode current.

FIG. 3B is a schematic representation 360 of the transformer 302 shown in FIG. 3A. As described with reference to FIG. 3A, the transformer 302 includes terminals 330-335, the primary windings 304, the secondary windings 306, and the shielding windings 308. Also shown is the inter-winding capacitance $C_{ps}$ and a representation of a common-mode current $i_{ps}$ which has been reduced to 0 Amps due to the idealized configuration of the transformer 302.

Figure 4:
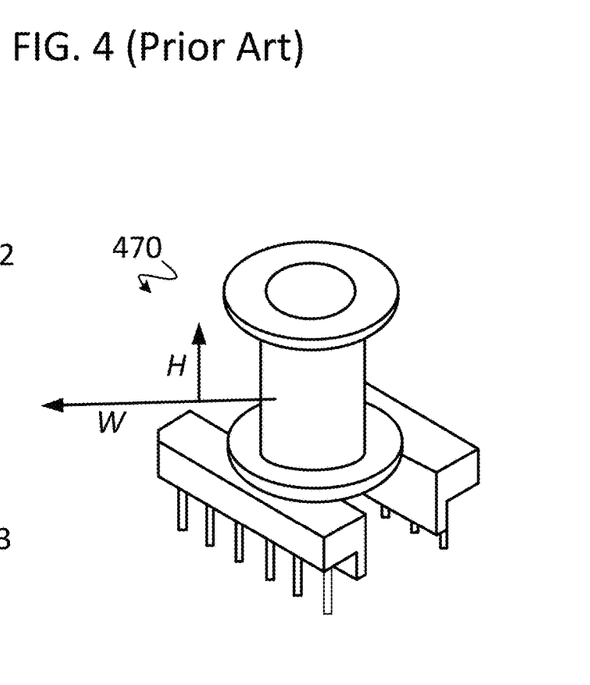
FIG. 4 is a conventional transformer bobbin.

In an ideal physical implementation of the transformer 302, a bobbin, such as a bobbin 470 shown in FIG. 4, is wound such that strands of the shielding windings 308 and strands of the secondary windings 306 are exactly aligned. For reference, the bobbin 470 has a first dimension H that is parallel to a first extent of the bobbin 470, and a second dimension W that is perpendicular to the first dimension H.

Figure 5:
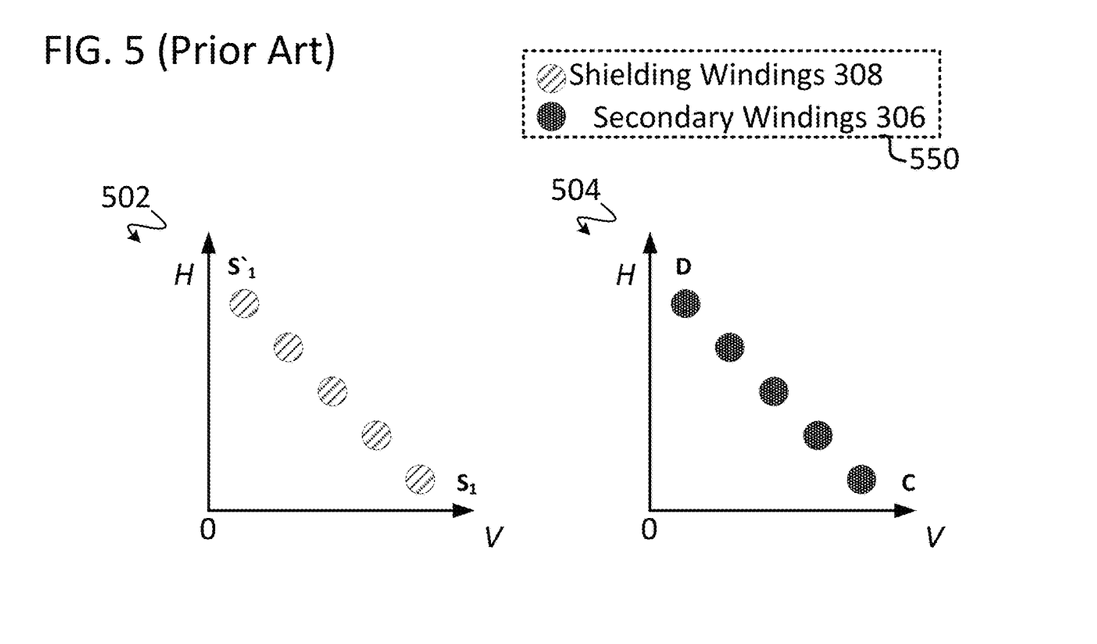
FIG. 5 is a graph of voltages developed at windings of the ideal transformer shown in FIG. 3B at points along the transformer bobbin shown in FIG. 4.

Given the idealized implementation of the transformer 302 using the bobbin 470, simplified graphs 502 and 504 of FIG. 5, with reference to legend 550, illustrate a voltage potential V developed at each point of the windings 306, 308 along the first dimension H of the bobbin 470. The graph 502 illustrates the voltage V developed across shielding windings 308 of the transformer 302 along the first dimension H of the bobbin 470, and the graph 504 illustrates the voltage V developed across secondary windings 306 of the transformer 302 along the first dimension H of the bobbin 470. As shown by the graphs 502, 504, for each position along the first dimension H of the bobbin 470, a voltage potential of the shielding windings 308 is the same as a voltage potential of the secondary windings 306. Thus, because there is no voltage difference between the shielding windings 308 and the secondary windings 306, common mode noise current $i_{ps}$ cannot flow from the shielding windings 308 to the secondary windings 306.

Figure 6:
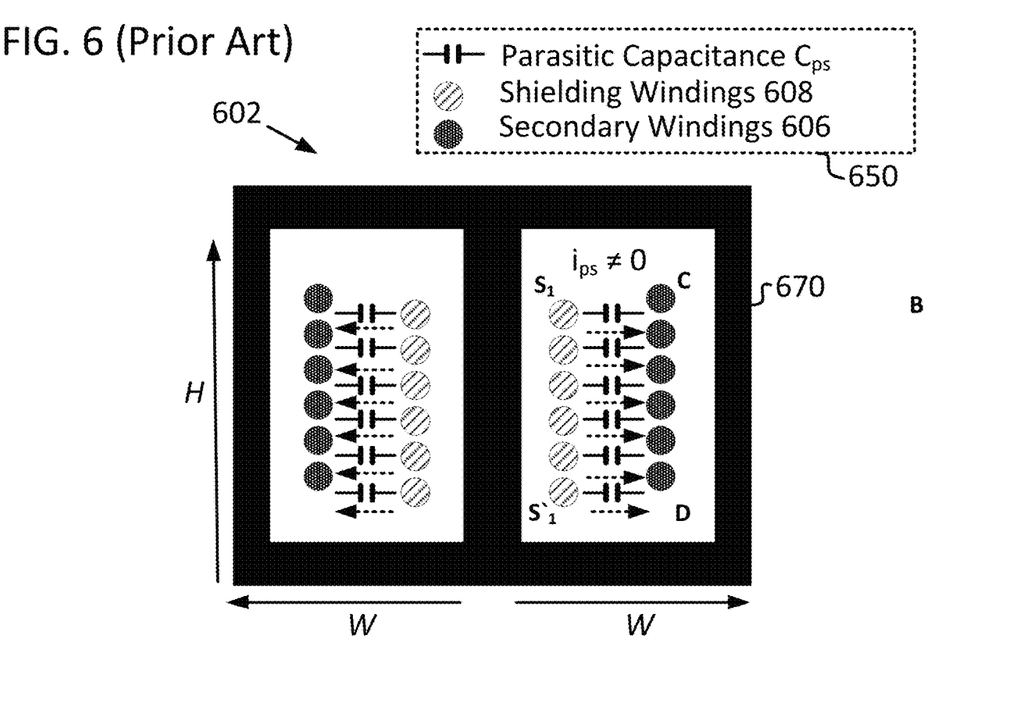
FIG. 6 is a representation of a non-ideal conventional transformer for blocking common mode noise current.

In practice, however, the idealized configuration of the transformer 302, which assumes strict alignment between the shielding windings 308 and the secondary windings 306 as the bobbin 470 is wound cannot be repeatably implemented. FIG. 6 includes a simplified representation of a non-ideal transformer 602 having a bobbin 670 (shown as a cross-section) that is similar to the bobbin 470. The transformer 602 includes primary windings (not shown), shielding windings 608, secondary windings 606, and inter-winding parasitic capacitance $C_{ps}$, as indicated by a legend 650. The shielding windings 608 include terminals $S_1$ and $S'_1$, and the secondary windings 606 include terminals C and D. The bobbin 670 has a first dimension H, and a second dimension W that is perpendicular to the first dimension H. As shown in FIG. 6, practically, the shielding windings 608 and secondary windings 606 of a transformer 602 that is similar to the transformer 302 of FIG. 3A cannot be perfectly aligned, and as such, a voltage difference between the shielding windings 608 and the secondary windings 606 will cause common mode noise current $i_{ps}$ to flow from the shielding winding 608 to the secondary windings 606.

Figure 7:
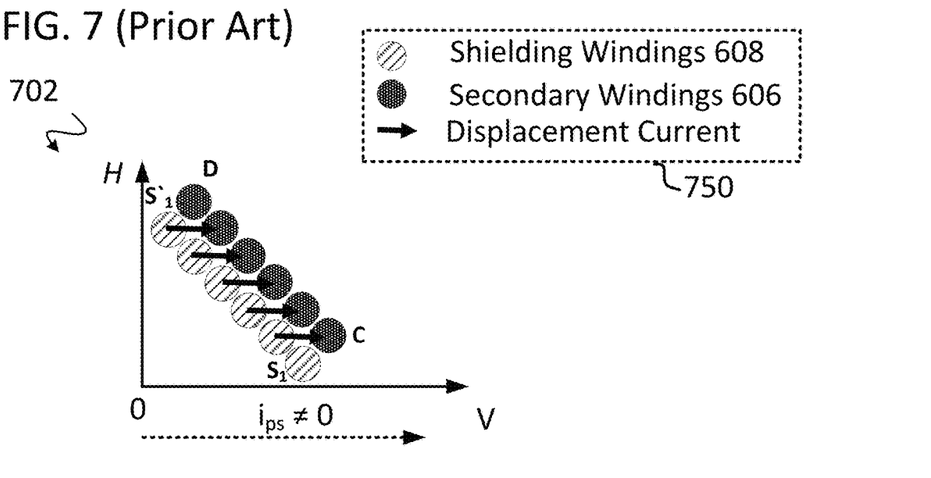
FIG. 7 is a graph of voltages developed at windings of the non-ideal transformer shown in FIG. 6 at points along the transformer bobbin shown in FIG. 6.

The non-idealities of the transformer 602 are further illustrated in FIG. 7. A simplified graph 702 of FIG. 7, with reference to legend 750, illustrate a voltage potential V developed at various points of the windings 606, 608 along the first dimension H of the bobbin 670 for the non-ideal transformer 602. As shown, because of misalignment between the windings 606, 608, the voltage V developed across shielding windings 608 of the transformer 602 and the secondary windings 606 of the transformer 602 is not identical for each point along the first dimension H of the bobbin 670. Because the shielding windings 608 and the secondary windings 606 are not sufficiently aligned along the first dimension H, the voltage V developed across the windings 606, 608 develops a displacement current between the windings 606, 608. Thus, common mode noise current $i_{ps}$ flows from the secondary windings to the shielding windings.

Figure 8A:
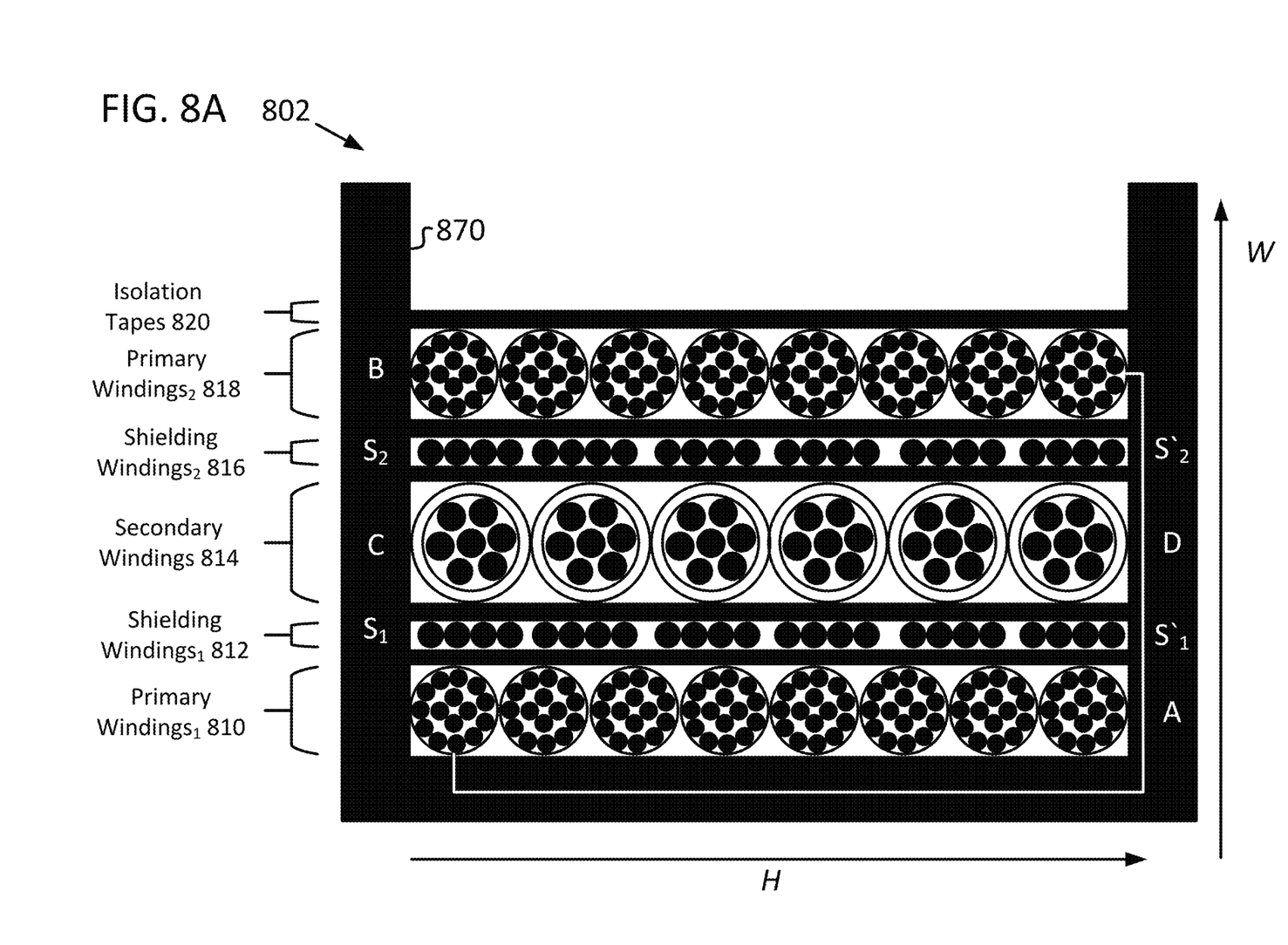
FIG. 8A is a representation of a transformer for blocking common mode noise current, in accordance with some embodiments.

FIG. 8A illustrates a simplified drawing of a portion of a transformer 802 having a generally cylindrical bobbin 870, in accordance with some embodiments. Only a portion of a cross-section of the bobbin 870 and the windings is shown to simplify the description, so it is understood that a second portion is generally a mirrored reflection of the portion shown reflected about the bottom horizontal axis. In some embodiments, the bobbin 870 provides a central ferrite core for the transformer 802. The bobbin 870 has a first dimension H and a second dimension W that is perpendicular to the first dimension H, similar to that as described with reference to the bobbin 470 of FIG. 4. The transformer 802 includes first primary windings$_1$ 810 having a terminal A, first shielding windings$_1$ 812 having terminals $S_1$ and $S'_1$, secondary windings 814 having terminals C and D, second shielding windings$_2$ 816 having terminals $S_2$ and $S'_2$, second primary windings$_2$ 818 having a terminal B, and isolation tapes 820 that are illustrated as thick black bars. The first primary windings$_1$ 810 and the second primary windings$_2$ 818 are electrically serially connected with each other, as indicated by a white line connecting the windings 810, 818. As shown, the first shielding windings$_1$ 812 are disposed along the first dimension H between the first primary windings$_1$ 810 and the secondary windings 814. The second shielding windings$_2$ 816 are disposed along the first dimension H between the second primary windings$_2$ 818 and the secondary windings 814. Thus, the shielding windings 812, 816 are interleaved between the primary windings 810, 818 and the secondary windings 814 of the transformer 802, thereby advantageously eliminating common mode noise current flow between the shielding windings 812, 816 and the secondary windings 814 of the transformer 802, as described below. In this configuration, the first primary windings$_1$ 810 are wound around the core of the bobbin 870, the first shielding windings$_1$ 812 are wound around the first primary windings$_1$ 810, the secondary windings 814 are wound around the first shielding windings$_1$ 812, the second shielding windings$_2$ 816 are wound around the secondary windings 814, and the second primary windings$_2$ 818 are wound around the second shielding windings$_2$ 816.

In some embodiments, the two separate shielding windings 812, 816 start at a terminal shared by $S'_1$ and $S'_2$ at a first side of the bobbin 870 and end (at $S_1$ and $S_2$) at the same position at the opposite (second) side of the bobbin 870. Therefore, the shielding windings 812, 816 are advantageously aligned symmetrical about the secondary windings 814. Because the shielding windings 812, 816 are aligned symmetrically on either side (i.e., both of two opposite sides—inside and outside) of the secondary windings 814, for each point along the first dimension H of the bobbin 870, a voltage of one shielding winding (e.g. 812) is the same as the voltage of the other shielding winding (e.g., 816). Consequently, there is no voltage difference between the two shielding windings 812, 816. Thus, displacement current which flows from the first shielding windings 812 to the secondary windings 814 is canceled by displacement current which flows from the second shielding windings 816 to the secondary windings 814. As a result, the common mode noise current $i_{ps}$ is advantageously blocked from flowing from a primary side of the transformer 802 to a secondary side of the transformer 802. Advantageously, because the shielding windings 812, 816 are arranged symmetrically on either side of the secondary windings 814, the transformer 802 is easily manufacturable because the shielding windings 812, 816 do not have to be individually exactly aligned with the secondary windings 814.

Figure 8B:
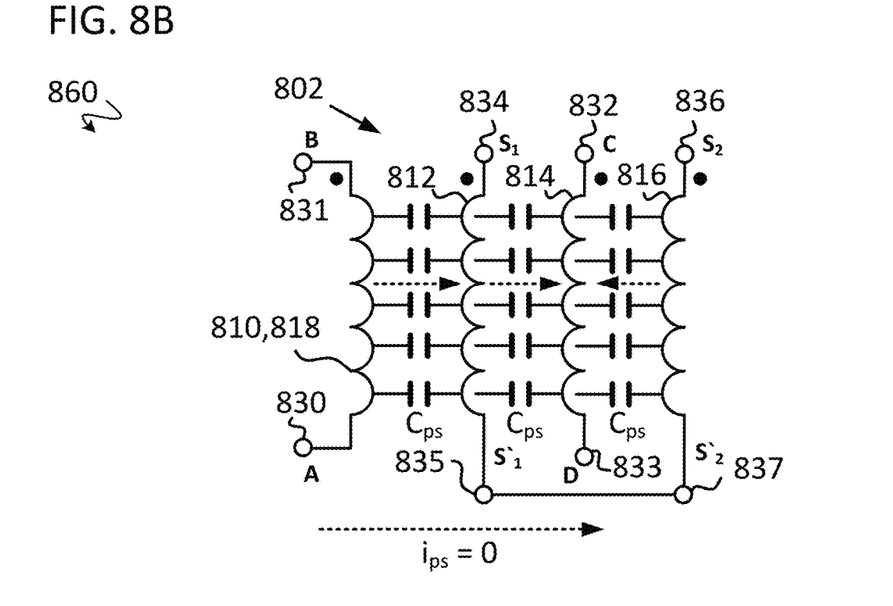
FIG. 8B is a schematic representation of the transformer shown in FIG. 8A for blocking common mode noise current, in accordance with some embodiments.

FIG. 8B is a simplified schematic representation 860 of the transformer 802 shown in FIG. 8A, in accordance with some embodiments. As described with reference to FIG. 8A, the transformer 802 includes primary windings 810, 818, the secondary windings 814, the shielding windings 812, 816, and the terminals A (830), B (831), C (832), D (833), $S_1$ (834), $S'_1$ (835), $S_2$ (836), and $S'_2$ (837). The terminals 835 and 837 are configured to be electrically connected to each other. The terminals 834, 836 are configured to be floating (e.g., the terminals 834, 836 may be surrounded by tape or another electrical insulating material). Also shown is the inter-winding capacitance $C_{ps}$ and a representation of a common mode noise current $i_{ps}$ which has advantageously been reduced to 0 Amps due to the interleaved shielding windings 812, 816 which are aligned symmetrically on either side of the secondary windings 814.

Figure 8C:
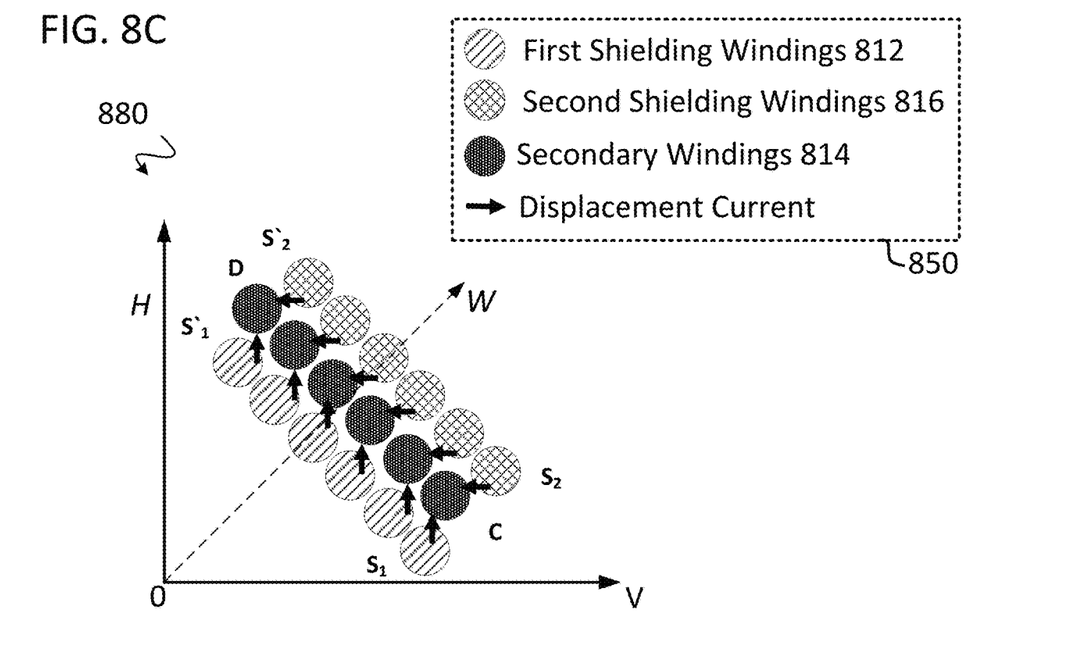
FIG. 8C is a graph of voltages developed at windings of the transformer shown in FIG. 8A at points along the portion of the transformer bobbin shown in FIG. 8A, in accordance with some embodiments.

A simplified graph 880 of FIG. 8C, with reference to legend 850, illustrates a voltage potential V developed at each point along the windings 812, 814, 816 and along the first dimension H of the bobbin 870 for the transformer 802, in accordance with some embodiments. Also shown is the second dimension W of the bobbin 870. As shown, because the shielding windings 812, 816 are aligned symmetrically on either side of the secondary windings 814, displacement current from the first shielding windings 812 to the secondary windings 814 is canceled by displacement current from the second shielding windings 816 to the secondary windings 814. As a result, common mode noise current $i_{ps}$ is advantageously blocked from flowing from a primary side of the transformer 802 to a secondary side of the transformer 802.

Figure 9:
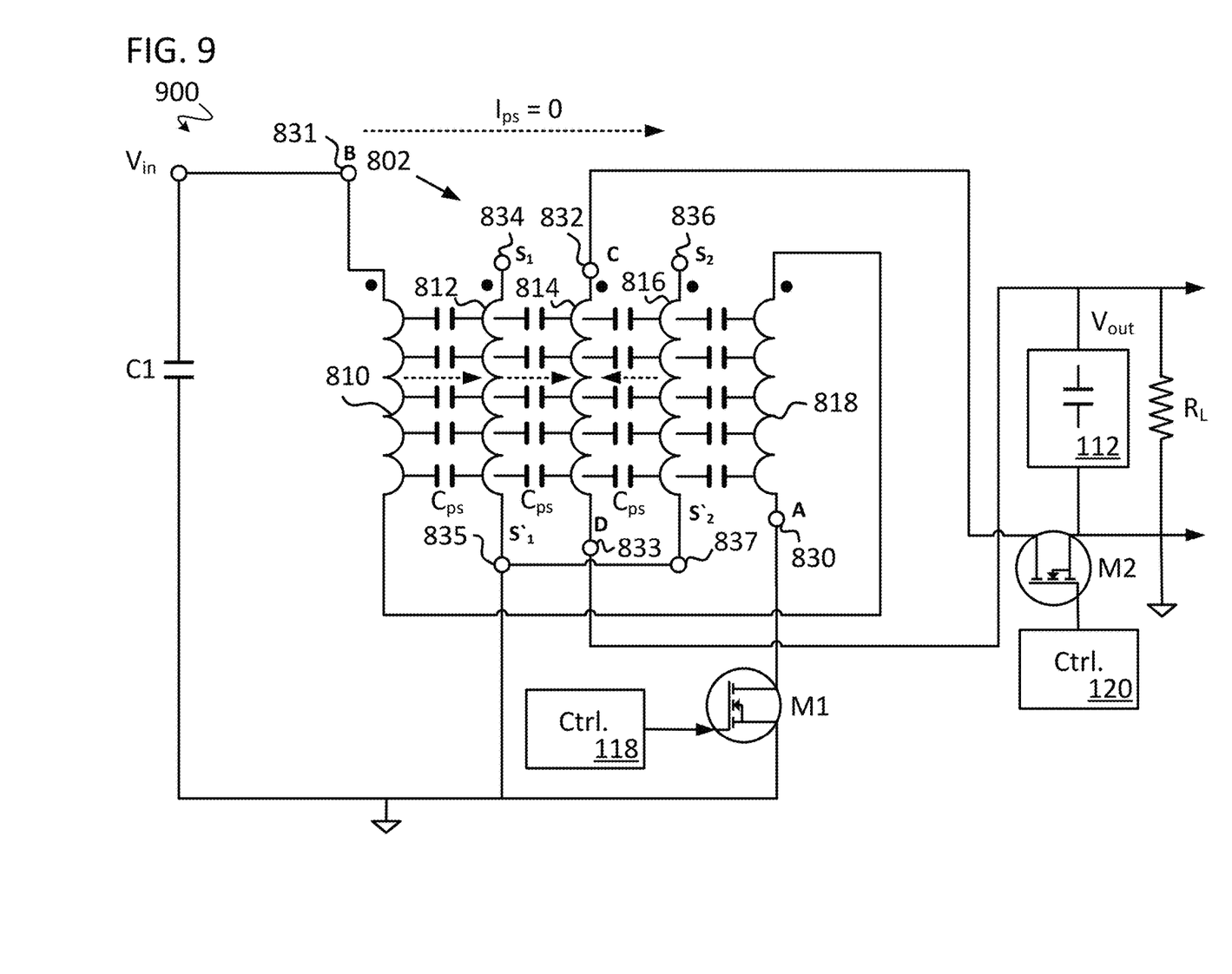
FIG. 9 is a portion of a simplified schematic of a power converter using the transformer shown in FIG. 8A, in accordance with some embodiments.

FIG. 9 is a simplified schematic of a portion of a power converter 900 that implements the power converter 100 of FIG. 1 using the transformer 802, in accordance with some embodiments. Some portions of the power converter 100 have been omitted from FIG. 9 to simplify the description but are understood to be present. The power converter 900 includes the input voltage capacitor C1 (electrically connected across an input voltage node for the input voltage $V_{in}$ and a primary-side ground node) that receives the input voltage $V_{in}$, the main switch M1, the primary-side controller circuit 118, the output buffer circuit 112 (electrically connected across an output voltage node for the output voltage $V_{out}$ and a secondary-side ground node) across which the output voltage $V_{out}$ is developed, the secondary-side switch M2, and the synchronous rectifier switch controller circuit 120. The power converter 900 is configurable to be connected to the load $R_L$.

As shown, the transformer 802 includes the primary windings 810, 818, the secondary windings 814, the shielding windings 812, 816, and the terminals A (830), B (831), C (832), D (833), $S_1$ (834), $S'_1$ (835), $S_2$ (836), and $S'_2$ (837). The first primary-side terminal A (830) is configured to be electrically connected to the drain node of the main switch M1 (i.e., a first node at the primary-side of the power converter 900). The source node of the main switch M1 is electrically connected to the primary-side ground node. The gate node of the main switch M1 is electrically connected to and controlled by the primary-side controller circuit 118. The second primary-side terminal B (831) is configured to be electrically connected to the input voltage node for the input voltage $V_{in}$ (i.e., a second node at the primary-side of the power converter 900). The terminals 835 and 837 are electrically connected to each other as the intermediate shielding terminal and are configured to be electrically connected to the primary-side of the power converter 900 at the voltage bias node, such as the primary-side ground node (i.e., a third node at the primary-side of the power converter). The first shielding terminal 834 and the second shielding terminal 836 of the shielding windings 812, 816, respectively, are configured to be electrically floating. The first secondary-side terminal C (832) is configured to be electrically connected to a drain node of the secondary-side switch M2 (i.e., a first node at a secondary-side of the power converter 900). The source node of the secondary-side switch M2 is electrically connected to the secondary-side ground node. The gate node of the secondary-side switch M2 is electrically connected to and controlled by the synchronous rectifier switch controller circuit 120. The second secondary-side terminal D (833) is configured to be electrically connected to the output voltage node for the output voltage $V_{out}$ (i.e., a second node at the secondary-side of the power converter 900). Also shown is the inter-winding capacitance $C_{ps}$ and a representation of a common mode noise current $i_{ps}$ which has advantageously been reduced to 0 Amps due the interleaved shielding windings 812, 816 which are aligned symmetrically on either side of the secondary windings 814. As shown, because the common mode noise current $i_{ps}$ is blocked from flowing from the primary side of the power converter 900 to the secondary side of the power converter 900, no Y Capacitor (or a very small Y Capacitor) is required to meet EMI standards.

Figure 10:
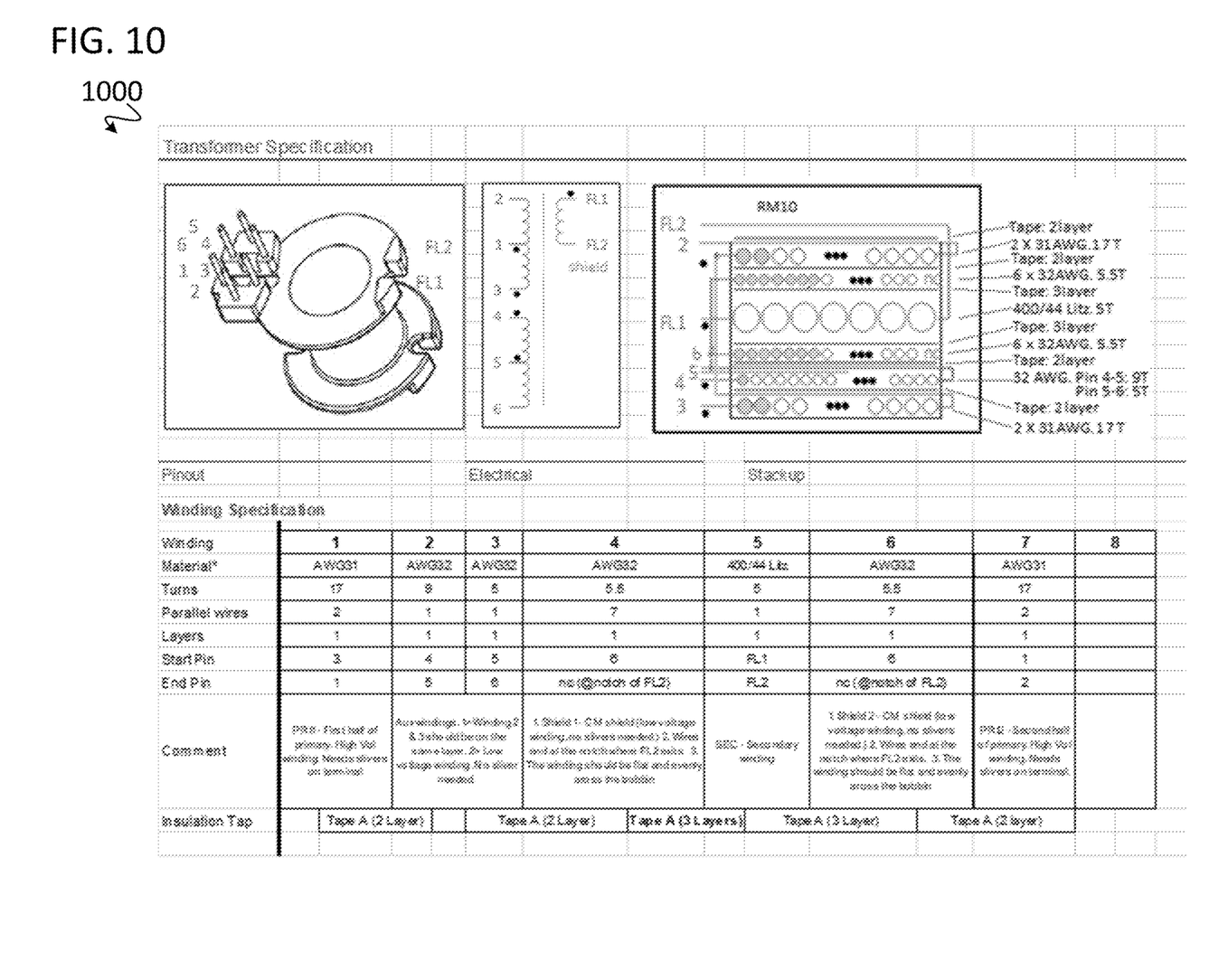
FIG. 10 is an example transformer specification for the transformer shown in FIG. 8A, in accordance with some embodiments.

FIG. 10 shows example transformer specification details 1000 for the transformer 802, in accordance with some embodiments. In practice, for a transformer, such as the transformer 802, having two shielding layers, the number of turns of shielding windings is based on the number of secondary windings of the transformer. In some embodiments, if the start terminals of the shielding windings and secondary windings are on the opposite side of the bobbin, the number of shielding winding turns equals the number of secondary winding turns plus 0.5. In other embodiments, if the start terminals of the shielding windings and the secondary windings are on the same side of the bobbin, the number of shielding winding turns equals the number of secondary winding turns. In some embodiments, the AWG of the shielding windings should be selected to be small enough such that there is minimum skin effect loss. In some embodiments, the shielding layer should completely fill the bobbin winding window. In such embodiments, the number of parallel wire strands of the shielding windings can be calculated as, $$\text{Number Wire Strands} = \frac{\text{Winding Area Length} \times K}{\text{Number Shielding Winding Turns} \times \text{Diameter of Shielding Winding}} \quad (1)$$

where K is the bobbin winding window filling factor, in the range of 0.5 to 1, depending on the winding process.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A transformer, comprising:
   a first primary winding and a second primary winding serially electrically connected in a primary-side series combination, the primary-side series combination having a first primary-side terminal and a second primary-side terminal;
   a secondary winding having a first secondary-side terminal and a second secondary-side terminal and being disposed between the first primary winding and the second primary winding;
   a first wire shielding winding and a second wire shielding winding serially electrically connected in a shielding series combination at an intermediate shielding terminal, the shielding series combination having a first shielding terminal and a second shielding terminal;
   wherein:
   the first wire shielding winding is disposed between the first primary winding and the secondary winding;
   the second wire shielding winding is disposed between the second primary winding and the secondary winding;
   the first wire shielding winding and the second wire shielding winding are aligned symmetrically on opposite sides of the secondary winding and along a height dimension from a first turn to a last turn of the secondary winding;
   a number of wire strands of the first and second wire shielding windings is equal to a first product that is equal to a winding area length multiplied by a bobbin winding window filling factor divided by a second product that is equal to a number of shielding winding turns multiplied by a diameter of the first and second wire shielding windings; and
   the bobbin winding window filling factor is in a range of 0.5 to 1.

2. The transformer of claim 1, wherein:
   the first primary-side terminal is configured to be electrically connected to a first primary-side node at a primary-side of a power converter;
   the second primary-side terminal is configured to be electrically connected to a second primary-side node at the primary-side of the power converter;
   the first secondary-side terminal is configured to be electrically connected to a first secondary-side node at a secondary-side of the power converter;
   the second secondary-side terminal is configured to be electrically connected to a second secondary-side node at the secondary-side of the power converter;

the intermediate shielding terminal is configured to be electrically connected to a third primary-side node at the primary-side of the power converter; and the first shielding terminal and the second shielding terminal are electrically floating.

3. The transformer of claim 2, wherein:

the third primary-side node at the primary-side of the power converter is a primary-side ground node.

4. The transformer of claim 3, wherein:

the first primary-side node at the primary-side of the power converter is a drain node of a main switch of the power converter;

the second primary-side node at the primary-side of the power converter is an input voltage node for an input voltage of the power converter;

the first secondary-side node at the secondary-side of the power converter is a drain node of a secondary-side switch of the power converter; and the second secondary-side node at the secondary-side of the power converter is an output voltage node for an output voltage of the power converter.

5. The transformer of claim 1, further comprising:

a cylindrical bobbin having a central core;

wherein:

the first primary winding is wound around the central core of the cylindrical bobbin;

the first wire shielding winding is wound around the first primary winding;

the secondary winding is wound around the first wire shielding winding;

the second wire shielding winding is wound around the secondary winding; and the second primary winding is wound around the second wire shielding winding.

6. A power converter comprising the transformer of claim 1, and further comprising:

a first switch electrically connected between the first primary-side terminal and a primary-side ground node; and a second switch electrically connected between the first secondary-side terminal and a secondary-side ground node;

and wherein:

the second primary-side terminal is electrically connected to an input voltage node for an input voltage; and the second secondary-side terminal is electrically connected to an output voltage node for an output voltage.

7. The power converter of claim 6, wherein:

the first wire shielding winding and the second wire shielding winding being aligned symmetrically on opposite sides of the secondary winding causes a common mode noise current to be blocked from flowing from a primary side of the power converter to a secondary side of the power converter.

8. A method comprising:

forming a first primary winding of a transformer;

forming a first wire shielding winding of the transformer;

forming a secondary winding of the transformer, the secondary winding having a first secondary-side terminal and a second secondary-side terminal, and the first wire shielding winding being disposed between the first primary winding and the secondary winding;

forming a second wire shielding winding of the transformer;

symmetrically aligning the first wire shielding winding and the second wire shielding winding on opposite sides of the secondary winding and along a height dimension from a first turn to a last turn of the secondary winding, wherein a number of wire strands of the first and second wire shielding windings is equal to a first product that is equal to a winding area length multiplied by a bobbin winding window filling factor divided by a second product that is equal to a number of shielding winding turns multiplied by a diameter of the first and second wire shielding windings, and the bobbin winding window filling factor is in a range of 0.5 to 1;

forming a second primary winding of the transformer, the secondary winding being disposed between the first primary winding and the second primary winding, and the second wire shielding winding being disposed between the second primary winding and the secondary winding;

electrically connecting the first primary winding and the second primary winding in a primary-side series combination at an intermediate primary-side terminal, the primary-side series combination having a first primary-side terminal and a second primary-side terminal; and electrically connecting the first wire shielding winding and the second wire shielding winding in a shielding series combination at an intermediate shielding terminal, the shielding series combination having a first shielding terminal and a second shielding terminal.

9. The method of claim 8, further comprising:

electrically connecting the first primary-side terminal to a first primary-side node at a primary-side of a power converter;

electrically connecting the second primary-side terminal to a second primary-side node at the primary-side of the power converter;

electrically connecting the first secondary-side terminal to a first secondary-side node at a secondary-side of the power converter;

electrically connecting the second secondary-side terminal to a second secondary-side node at the secondary-side of the power converter; and electrically connecting the intermediate shielding terminal to a third primary-side node at the primary-side of the power converter;

wherein:

the first shielding terminal and the second shielding terminal are electrically floating.

10. The method of claim 9, wherein:

the third primary-side node at the primary-side of the power converter is a primary-side ground node.

11. The method of claim 10, wherein:

the first primary-side node at the primary-side of the power converter is a drain node of a main switch of the power converter;

the second primary-side node at the primary-side of the power converter is an input voltage node for an input voltage of the power converter;

the first secondary-side node at the secondary-side of the power converter is a drain node of a secondary-side switch of the power converter; and the second secondary-side node at the secondary-side of the power converter is an output voltage node for an output voltage of the power converter.

12. The method of claim 11, further comprising:

providing a cylindrical bobbin having a central core;

wherein:

forming the first primary winding comprises winding the first primary winding around the central core of the cylindrical bobbin;

forming the first wire shielding winding comprises winding the first wire shielding winding around the first primary winding;

forming the secondary winding comprises winding the secondary winding around the first wire shielding winding;

forming the second wire shielding winding comprises winding the second wire shielding winding around the secondary winding; and forming the second primary winding comprises winding the second primary winding around the second wire shielding winding.

13. The method of claim 8, further comprising:

electrically connecting a first switch between the first primary-side terminal and a primary-side ground node;

electrically connecting a second switch between the first secondary-side terminal and a secondary-side ground node;

electrically connecting the second primary-side terminal to an input voltage node for an input voltage; and electrically connecting the second secondary-side terminal to an output voltage node for an output voltage.

14. The method of claim 13, further comprising:

the first wire shielding winding and the second wire shielding winding being aligned symmetrically on opposite sides of the secondary winding causing a common mode noise current to be blocked from flowing from a primary side of a power converter to a secondary side of the power converter.

* * * * *